Sept. 12, 1939.　　　　W. J. LUTEY　　　　2,172,515
RESILIENT CROSS LINK FOR TIRE CHAINS
Original Filed March 5, 1938

INVENTOR.
William J. Lutey
BY Robert L. Rockwell
ATTORNEY

Patented Sept. 12, 1939

2,172,515

UNITED STATES PATENT OFFICE 2,172,515

RESILIENT CROSS LINK FOR TIRE CHAINS

William J. Lutey, Seattle, Wash.

Application March 5, 1938, Serial No. 194,141
Renewed February 4, 1939

5 Claims. (Cl. 152—222)

This invention relates to improvements in cross links for tire chains, in general, and in particular to resilient links for such chains having outstanding non-slip features.

The embodiment of the invention herein disclosed comprises a pair of strips of strong, tough, pliable material, each having a plurality of spaced apart transverse cuts through a part only of the strip to provide a plurality of short rib-like projections, which are used in the assembling together of the pair of strips to form a strong cross link having a plurality of raised portions that provide a multiplicity of sharp edges. These raised portions with their sharp edges are so disposed that they are particularly effective in preventing tire slippage in any direction on wet, muddy or frosty paving, in soft mud, loose sand, snow, or wherever tire chains are needed.

An object of the invention is to provide an article of the kind described, in which the novel disposition of the material comprising the link greatly increases its non-slip features without increasing the thickness of the material in the link at the leading and following edges, thus reducing the vibration when driving on hard surfaced roads.

Another object is to provide an article of the kind described in which the wheel load is concentrated on a double thickness of the resilient material at the time the raised projections are in use to prevent slipping.

A further object is to provide an improved article of the kind described, that may be made easily and quickly from inexpensive materials, thus providing a cheap yet effective substitute for the metal cross links of tire chains.

Other objects and advantages will be apparent to those skilled in the art from the following detailed description of a preferred form of the invention, which consists of certain parts in cooperative combination, hereinafter described, illustrated in the accompanying drawing, and embraced in the appended claims.

Figure 1:
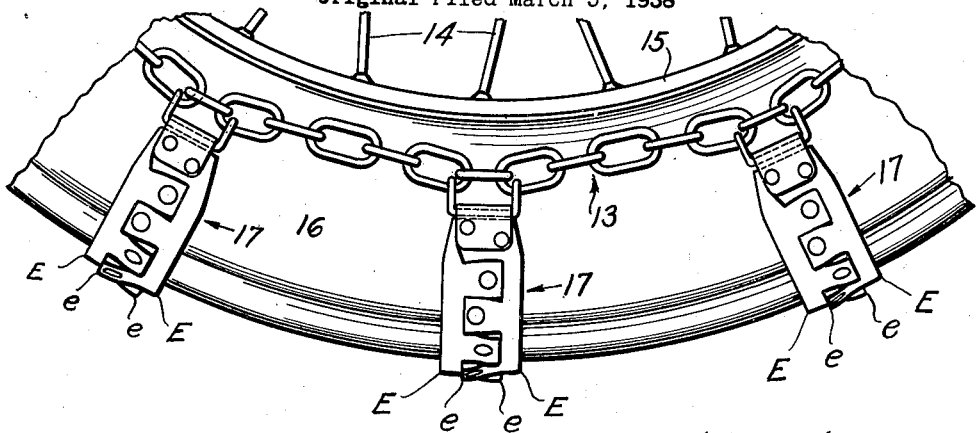
Figure 1 is a fragmentary side elevation of a wheel equipped with tire chains comprising the cross links of my invention.

Like reference numerals are used to indicate like parts throughout the drawing, wherein the parts 6 and 6' are the right and left strips, respectively, of strong, tough, pliable material, such as the casings of old pneumatic tires, from which the cross links of my invention may be constructed. The inner edge portions of each of said strips is cut through a part only of its width, as indicated at 7, to form a plurality of oppositely disposed rib-like sections 8 and 8'. The second from the end section shown and successive alternate said sections of strip 6, and the first and successive alternate said sections from the end section of strip 6' may be provided with rivet holes 9 near their free ends, and the other said sections of the strips may be provided with rivet holes 9' near their base ends. Holes 9" may be provided in the end sections of the strips for the end-strap rivets.

Figure 2:
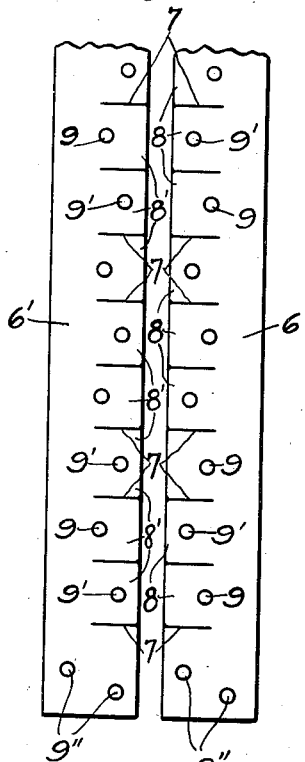
Fig. 2 is a plan view of a portion of the lengths of a pair of strips used in making one of the cross links, showing the plurality of transverse cuts and holes for the rivets.

With a pair of strips positioned as shown in Fig. 2, they may be combined preparatory to riveting by alternately raising and depressing the successive projections of strip 6, and alternately depressing and raising the successive projections of strip 6, and by then forcing the two strips together with their respective sections alternately overlapping and underlapping. This operation is done best by a machine that also holds the strips firmly together with holes 9" of the lapping end sections in line, so end straps 10 linked with U-links 11 may be secured in position by means of rivets 12.

Figure 3:
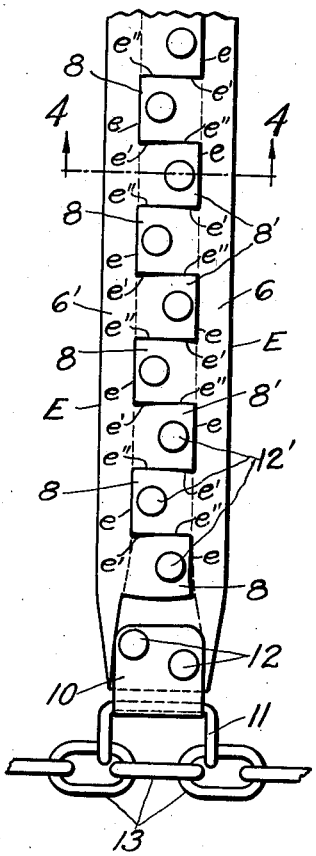
Fig. 3 is a plan view of the aforesaid strips after riveting, showing one form of end strap and link for fastening the completed cross link to the side chains.
Figure 4:
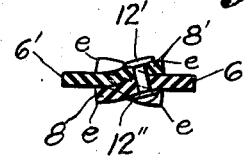
Fig. 4 is a transverse section through the cross link taken on broken line 4—4 of Fig. 3.

The combined strips securely fastened together at their ends then may be completed by means of rivets 12', inserted through aligned holes 9 and 9' in each pair of lapped strip sections, and washers 12", as shown clearly in Figs. 3 and 4.

Figure 5:
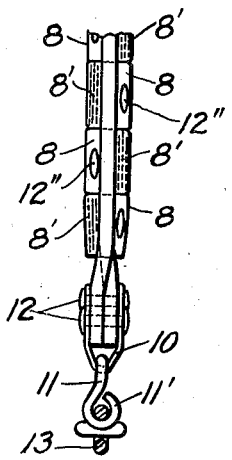
Fig. 5 is a right edge view of the end structure of the cross link shown in Fig. 3.

Eye ends 11' of the metal U-links preferably are open when joined to the respective ends of the pair of strips by means of metal end straps 10, and provide convenient means for fixedly securing the cross links to the usual side chains 13 by closing said eye ends around the links of the side chains, as shown best in Fig. 5.

Any number of the cross links of my invention may be used to meet the needs of a particular class of service. I find, however, that in general fewer of my cross links are required to prevent the wheels from slipping than when other kinds of cross links are used.

Fig. 1 of the drawing illustrates a fragmentary side elevation of a wheel having wire spokes 14, metal rim 15 and tire 16, equipped with a tire chain comprising side chains 13 and a plurality of my cross links, represented as a whole by the numeral 17.

It will be apparent that the overlapping rib-like sections 8 and 8' produce a double thickness of material at the central portion of each cross link, and that said rib-like sections form alternate right and left projections, each of which has three sharp edges $e$, $e'$ and $e''$ projecting outwardly from the main surface of the cross link.

Edges $e$ are particularly effective, in combination with edges E of the pair of strips comprising the cross link, in preventing longitudinal slippage of the wheel, whereas the plurality of side edges $e'$ are particularly effective in preventing side slippage of the wheel in one direction, and side edges $e''$ equally so for the other direction.

A like number of raised edges also project from the inner surfaces of the cross links. These engage the serrations of the tread of the tire and increase its grip on the cross link, thus greatly reducing the forces usually carried by the side chains. The cross links being constructed preferably of strips cut from old tire casings, are gripped more firmly than metal cross links by the tires because of the higher coefficient of friction of rubber to rubber, especially when moist.

It will be obvious that after the projections on one side of the cross links become worn, they may be turned inside out, by removing the tire chain and replacing it on the wheel with the side chains reversed axially of their lengths, so they fit on opposite sides of the tire casing, thus providing a new set of sharp edges to prevent slipping with little loss in effectiveness, and greatly increasing the length of the effective life of the cross links.

Although the material has a double thickness in the central portion longitudinally of the cross link, thus enabling the tire to force the projections with their sharp edges into the soft material, such as snow and mud, to prevent slipping, it will be seen that a single thickness of material only is used at the leading and following edges taken in the direction of rotation of the tire, and that this permits greater flexure in the tire casing and reduces the vibration, and thus permits higher speeds with safety, especially when driving on hard surfaced roads.

From the foregoing description it will be apparent to those skilled in the art, that the invention may be made from strips of resilient rubberized multiple layer fabric material, such as may be cut easily from cheap discarded tire casings, and that these are easily and quickly assembled and fastened with other inexpensive items to form a simple and cheap, yet effective, substitute for the metal cross links of tire chains.

It will be apparent also that the essential co-acting elements may be constructed and combined in various other equivalent forms, and from other materials and for other uses, without departing from the purpose and intent of the invention within the scope of the appended claims.

For example, although I prefer to use rivets to fasten the strips of rubberized material together at each pair of overlapping sections, only a portion of the said pairs of sections may be riveted together, or a part or all of the overlapping sections may be held together with a suitable cement or by vulcanizing. Also, other means than the construction shown may be used to fasten the ends of the cross links to the side chains.

Having illustrated and described a preferred form of my invention, what I claim as new and desire to protect by Letters Patent is:

1. A cross link for tire chains comprising a pair of strips of resilient material having alternately overlapping and underlapping rib-like sections, and means for fastening said sections together.

2. A cross link for tire chains comprising a pair of strips of resilient material having a plurality of alternately overlapping and underlapping rib-like sections, and metallic means fastening said sections together.

3. A cross link for tire chains comprising a pair of strips of resilient material, each said strip having a plurality of rib-like sections that alternately overlap and underlap with those of the other strip, and rivet means fixedly securing said lapped rib-like sections together.

4. A cross link for tire chains comprising a pair of strips of resilient material, having a plurality of alternately overlapping and underlapping rib-like sections and lapped end sections, means for fastening said rib-like sections together, and terminal means fixedly secured to said lapped end sections.

5. In a cross link for tire chains comprising a pair of side chains, the combination of a pair of strips of resilient material, each said strip having a plurality of rib-like sections that alternately overlap and underlap with those of the other strip, and also having end sections that lap one with the other, means for fastening said lapped rib-like sections together, terminal means fixedly secured to said lapped end sections, and link means for fixedly securing said terminal means to said side chains.

WILLIAM J. LUTEY.